(12) United States Patent
Henry et al.

(10) Patent No.: US 7,277,456 B2
(45) Date of Patent: Oct. 2, 2007

(54) METHOD FOR MANAGING RESOURCES OF A LINK IN A COMMUNICATION NETWORK

(75) Inventors: Jean-Baptiste Henry, Melesse (FR); Sébastien Perrot, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 428 days.

(21) Appl. No.: 10/479,136

(22) PCT Filed: May 24, 2002

(86) PCT No.: PCT/EP02/05715

§ 371 (c)(1),
(2), (4) Date: Nov. 26, 2003

(87) PCT Pub. No.: WO02/098070

PCT Pub. Date: Dec. 5, 2002

(65) Prior Publication Data

US 2004/0151153 A1    Aug. 5, 2004

(30) Foreign Application Priority Data

May 29, 2001 (EP) .................................. 01113121
Jun. 19, 2001 (EP) .................................. 01114652

(51) Int. Cl.
*H04J 3/16* (2006.01)
(52) U.S. Cl. ..................... 370/468; 370/431; 370/467

(58) Field of Classification Search .................... None
See application file for complete search history.

(56) References Cited

U.S. PATENT DOCUMENTS

| | | | | |
|---|---|---|---|---|
| 6,389,496 B1 * | 5/2002 | Matsuda | ..................... | 710/316 |
| 6,611,891 B1 * | 8/2003 | Hewitt et al. | ................ | 710/306 |
| 6,920,509 B1 * | 7/2005 | Matsuda | ........................ | 710/8 |
| 2001/0026557 A1 * | 10/2001 | Gaedeken et al. | .......... | 370/442 |

FOREIGN PATENT DOCUMENTS

| | | |
|---|---|---|
| EP | 0 933 900 A | 8/1999 |
| EP | 1 113 625 A | 7/2001 |
| WO | 01 38996 A | 5/2001 |

OTHER PUBLICATIONS

Search Report.

* cited by examiner

*Primary Examiner*—Duc C. Ho
(74) *Attorney, Agent, or Firm*—Joseph J. Laks; Robert B. Levy (57) ABSTRACT

The invention concerns a method for managing resources of a link in a communication network comprising busses interconnected by at least one link to form a network in which the at least one link is transparent for some protocol layers of nodes connected to the busses. The inventive method comprises the step of making information of the resources available over the at least one link available to link-aware applications.

12 Claims, 6 Drawing Sheets

METHOD FOR MANAGING RESOURCES OF A LINK IN A COMMUNICATION NETWORK

This application claims the benefit under 35 U.S.C. § 365 of International Application PCT/EP02/05715, filed May 24, 2002, which claims the benefit of European Patent Application No. 01114652.9, filed Jun. 19, 2001 and European Patent Application No. 01113121.6, filed May 29, 2001.

BACKGROUND OF THE INVENTION

1. Field of the Invention

The invention concerns a method for managing resources of a link, which may be a wireless link, in a communication network in particular a network comprising wired communication busses interconnected with the help of wireless links.

2. Description of Related Art

In a network comprising a plurality of interconnected transmission media, the bandwidth available over each transmission medium may not necessarily be the same.

If one considers for example two IEEE 1394 wired serial busses connected together using a 5 GHz ETSI BRAN HiperLAN 2 wireless link, the bandwidth available on each of the wired busses can be of 100 Mb/s or more, while the bandwidth available over the wireless link may be limited to 30 Mb/s. Consequently, the wireless link constitutes a bottleneck for connections using this link.

Figure 1:
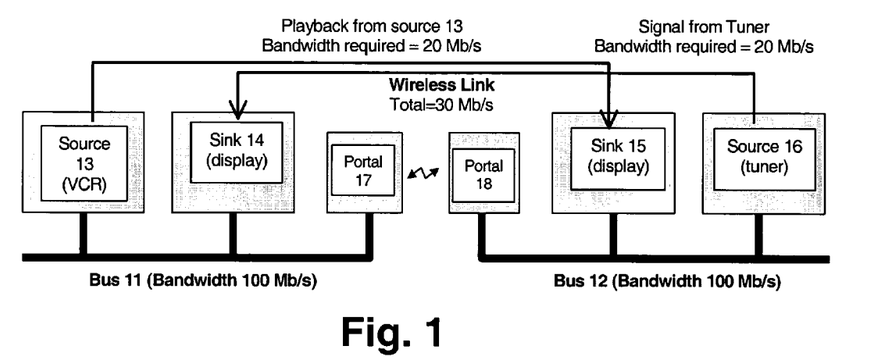
FIG. 1, already described, is a diagram of a network comprising a wireless link and illustrating the bandwidth bottleneck constituted by this link.

FIG. 1 is a diagram of one example of such a network. The network comprises two busses 11 and 12, connected to source device 13 and sink device 14, respectively to sink device 15 and source device 16. Source device 13 is for example a digital VCR, while sink devices 14 and 15 are displays and source device 16 is a tuner. Bus 11 is also connected to a portal 17, while bus 12 is connected to a portal 18, both portals forming a wireless link between busses 11 and 12. It is supposed that the wireless link is transparent to devices 13 to 16 at the level of IEEE 1394, i.e. these devices have the impression that they are on the same physical bus.

Supposing the available bandwidth on the wireless link is of 30 Mb/s, a first connection of 20 Mb/s is established between the VCR 13 and the display 15. A second connection between tuner 16 and display 14 can be established, since the link is transparent to devices 16 and 14, but if the bandwidth required for this second connection is greater than the remaining wireless bandwidth, the display 14 will not display proper pictures, if any at all. As far as the application having built the second connection is concerned, the connection was nevertheless established without incident at the IEEE 1394 level, because of the transparency of the link at that level.

The document EP-A-0 933 900, discloses a method for interconnecting 1394 busses by a 1394 bridge. In this document, each bus and the bridge consists of an independent bus, and the method allow two nodes from different bus to make bandwidth and channel reservation to allow an isochronous communication between the two nodes. This method consists of making the three corresponding bandwidth reservation on each independent bus, the one hosting the emitting node, the bridge and the one hosting the receiving host.

Contrary to what is disclosed in this document, we are in the case where the link that connects busses is transparent. That means, that a node on one bus sees all the nodes on the interconnected busses as belonging to the same network.

The object of the invention is a method for managing resources of a link in a communication network comprising at least two busses connected to the link to form a network, wherein the network forms a single virtual bus regarding the protocol used by a bus, said method comprising the steps of:
providing a link-aware application in a node of the network for obtaining link resource reservation information,
for establishment of a connection between devices over the link, accessing said information, and
determining whether the connection can be established as a function of this information.

SUMMARY OF THE INVENTION

The object of the invention is a method for managing resources of a link in a communication network comprising busses interconnected by at least one link to form a network in which the at least one link is transparent for some protocol layers of nodes connected to the busses, said method being characterized in that it comprises the step of making information of the resources available over the at least one link available to link-aware applications.

According to an embodiment, each link comprises a plurality of portals, at least one portal of a link comprising said resource information concerning its link.

According to an embodiment, the information comprises bandwidth available over the link. The information also comprises channels available over the link.

According to an embodiment, an application establishes a connection between two nodes of the network through the steps of:
(a) reserving a channel and bandwidth for the connection on the busses;
(b) identifying links on the path between the nodes to be connected;
(c) reserve resources for each link on said path if step (a) has been successful.

According to an embodiment, the step of reserving resources for each link comprises the step of:
having the application request the reservation of the same bandwidth and the same channel as reserved in step (a) from each link.

According to an embodiment, the step of reserving resources for each link further comprises the steps of:
by the application, sending identifiers of the nodes to be connected to a portal of a link whose resources are to be reserved;
having the link determine whether the requested bandwidth is available, as a function of the nodes to be connected;
accept or reject the bandwidth reservation request as a function of this determination.

According to an embodiment, the step of reserving resources for each link further comprises the steps of:
having the link check the availability of the requested channel, and if a channel over the link is available, accept the channel reservation;
check whether a maximum number of reserved channels on the link has been reached and in the affirmative, rejecting any further reservation.

According to an embodiment, the step of providing a register showing channel availability for the network and a register showing channel availability for each link, wherein both registers comprise the same number of channels, each link having a maximum number of channels which can be reserved in parallel, said maximum number being lower than or equal to the number of channels in the registers, a portal providing the resource information for a link checking, after a channel reservation has been accepted, whether the maximum number of channels which can be reserved in parallel has been reached, and in the affirmative, modifying the register of the link in order to show no available channels for that link.

BRIEF DESCRIPTION OF THE DRAWINGS

Other characteristics and advantages of the invention will appear during the description of a non-restrictive embodiment explained with the help of the attached drawings among which.

DETAILED DESCRIPTION OF PREFERRED EMBODIMENTS

Although the embodiment is based on the use of an ETSI BRAN Hiperlan 2 wireless link, other technologies may be used. An example of such a technology is a link implementing the Internet Protocol ('IP'). Moreover, the links between wired busses need not necessarily be wireless, although this is the case in the embodiment described below.

Information on IEEE 1394 may be found in the documents IEEE 1394-1995 and IEEE 1394a-2000 published by the IEEE.

1. General Information

In order to simplify explanations, the embodiment will be described with the help of figures illustrating links generally comprising two portals each. Nevertheless, the invention also applies to links comprising more than two portals.

Figure 2:
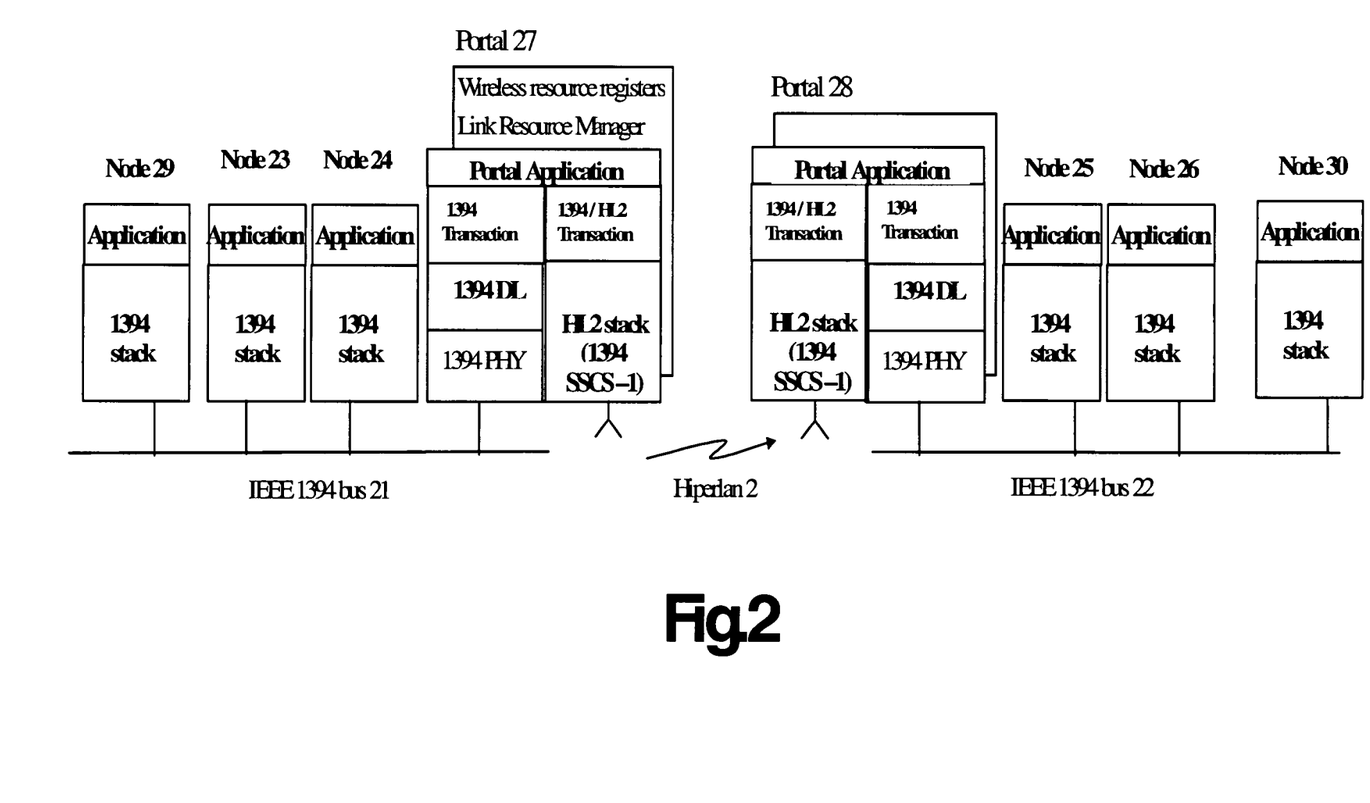
FIG. 2 is a diagram of a network according to the embodiment of the invention and comprising a wireless link and indicating the software stacks in portal devices constituting the wireless link, as well as registers used for implementing the invention.

FIG. 2 represents a network formed of two IEEE 1394 busses (also called device clusters) 21 and 22, each comprising a wired IEEE 1394 bus, a plurality of devices (respectively nodes 23, 24, 29 and 25, 26, 30) and a portal (for each bus, respectively 27 and 28) to the wireless Hiperlan 2 link. The nodes are IEEE 1394 devices. Applications are aware of the existence and location of the wireless link.

According to the present embodiment, the portals 27 and 28 are not transparent to the other devices, in the sense that they are also considered to be nodes on their respective busses, i.e. they are attributed a physical identifier after a bus reset. At the level of the IEEE 1394 layers however, the link is transparent: all nodes are considered to be on a single bus and physical identifiers are attributed accordingly after a reset. Portals 27 and 28 issue self identification packets to represent nodes on their respective clusters when bus resets are carried out.

Each node comprises an IEEE 1394 software stack, i.e. the physical layer, the link layer and the transaction layer, as well as an application layer. Each portal also comprises these layers on their wired bus interface. Lastly, the portals communicate using the Hiperlan 2 protocol stack.

2. Link Resource Manager and Associated Registers

According to the invention, the portals make wireless link related resource reservation information available to the applications of the nodes on the different clusters. According to the present embodiment, this information includes available bandwidth and channels over the link. This information is maintained in 'wireless resource registers' present in at least one of the portals of the wireless link, and can be accessed by the applications or the middleware of nodes on the different busses.

It is known that a IEEE 1394 bus, as defined in the IEEE 1394 1995 standard, comprises what is called an Isochronous Resource Manager (or 'IRM') which maintains two registers, called 'BANDWIDTH_AVAILABLE' and 'CHANNELS_AVAILABLE', respectively indicating the available bandwidth on the bus and the available channels, among a maximum of 64 isochronous channels.

Since according to the present embodiment the wireless link is transparent as far as the IEEE 1394 layers are concerned, a single IRM exists in the network.

The IRM BANDWIDTH_AVAILABLE register, as defined by the above standard, is given by table 1:

TABLE 1

| zeros | bw_remaining |
|---|---|
| 19 bits | 13 bits |

The initial value of the bw_remaining is equal to 0x1333 (4915 in the decimal system) bandwidth units. Each time an application of a node wishes to reserve bandwidth on the wired bus, it checks this value and decrements it by the required bandwidth if enough bandwidth is available. Else, the connection cannot be established.

The IRM CHANNELS_AVAILABLE register, as defined in the same standard, is given by table 2.

TABLE 2

| channels_available_hi |
|---|
| channels_available_lo |
| 32 bits |

The initial value of the register is 0xFFFFFFFF. Each bit represents the availability of a specific channel. The least significant bit of 'channels_available_hi' indicates the availability of the channel '0' and the most significant bit of 'channels_available_lo' represents the channel '63'. Each time an application wishes to reserve a channel, it checks the register, chooses an available channel and sets the corresponding bit of the register to '0'. When there are not sufficient channels available, the connection cannot be established.

In order to reserve bandwidth or a channel, a register is first read by an application through a Read request message.

The application receives a Read response message, which contains the content of the register. After checking the availability of the requested resource, the application locks access to the corresponding register and writes the appropriate new value. This lock and write operation is carried out by having the application issue a Lock request and having the IRM sending a Lock response. According to IEEE 1394 1995, the registers are accessed separately. According to IEEE 1394 2000, the Read is not necessary since the Lock response gives back the actual value in case of bad arguments on the Lock request.

According to the present embodiment, a resource manager is implemented at the link level. This resource manager will be called 'Link Resource Manager' or 'LRM' in what follows, to distinguish it from the IRM defined by IEEE 1394 1995.

According to the present embodiment, the LRM is implemented in one of the portals of the wireless link. It manages two registers, LINK_BANDWIDTH_AVAILABLE and LINK_CHANNEL_AVAILABLE which indicate respectively the bandwidth available over the wireless link and the available channels (in addition to other information).

The LRM LINK_BANDWIDTH_AVAILABLE register according to the present embodiment has the format given by table 3:

TABLE 3

| Source_PhyID | Sink_PhyID | f | channel | LRM_bw_remaining |
|---|---|---|---|---|
| 6 bits | 6 bits | 1 | 6 bits | 13 bits |

The 'LRM_bw_remaining' field has a signification similar to that of the bw_remaining field of the IRM BANDWIDTH_AVAILABLE register. Given the fact that the bandwidth available over the link is different from that available on a wired bus, the initial value of this parameter is different. If the bandwidth over the link is lower, the initial value in this field will also be lower, and if the available bandwidth is higher, then it will never reach zero when reservations are made, since the limiting factor will be the bandwidth on the busses connected to the wireless link.

The 'Source_PhyID' field contains the physical identifier of the source device. The 'Sink_PhyID' field contains the physical identifier of the sink device. The contents of these fields are defined by an application making a reservation (using the Lock request message), with the purpose of informing the LRM of the identity of the talker (source) node and of the listener (sink) node. Knowing these identifiers, the LRM can determine the actual available bandwidth which, as will be explained further on, may be different from that indicated in the 'link_bw_remaining' field of the LRM_BANDWIDTH_AVAILABLE register.

According to a variant embodiment, the Source_PhyID and Sink_PhyID fields of the request contain the physical identifiers of the portals between which a connection is to be reserved.

In wireless links with more than two portals, the bandwidth available between any two portals may be different, being for example function of the quality of transmission between portals. The LRM has to know which two portals are to be part of a connection in order to indicate the real bandwidth available between these two portals. The portals may be deduced by the LRM from the identities of the talker and listener nodes. The bandwidth indicated by the 'link_bw_remaining' field may thus in certain cases not reflect the real bandwidth available between any two portals.

According to the present embodiment, the 'link_bw_remaining' field indicates the largest bandwidth available between any two pairs of portals of the wireless link. An application can thus immediately determine that a reservation of bandwidth is not possible if the amount it requests is greater than the amount indicated in the 'link_bw_remaining' field. In all other cases, the LRM first calculates the bandwidth available between the two portals concerned by the reservation and eventually grants or rejects the reservation in the Lock response, giving in the response the real bandwidth available between the source and the sink in the link_bw_available field.

According to a variant embodiment, the 'link_bw_remaining' field contains a dummy value which is larger than the bandwidth any application could request. In this case, it is always the LRM which rejects a reservation of bandwidth, since the application cannot deduce any valid bandwidth information from its Read request.

In case wireless links are strictly limited to two portals, the bandwidth available over the link is not a function of the source and sink devices. According to a variant embodiment, in a network comprising such links, the first two fields of the LRM LINK_BANDWIDTH_AVAILABLE register are not required. Nevertheless, the use of these fields is also possible on two-portal wireless links.

The 'channel' field contains the number of the channel requested by the application making the reservation. This number is the same as the one which has already been allocated in the CHANNEL_AVAILABLE register of the IRM since, as will be seen later, the application first makes a reservation with the IRM of the IEEE 1394 network before making reservations with the LRMs of the wireless links. The content of the field is provided to the LRM through the Lock request for accessing the LRM LINK_BANDWIDTH_AVAILABLE.

The 'f' field contains a flag indicating the availability of the requested channel over the link. This field is used in the Lock response to indicate whether the requested channel is available ('0') or not ('1'). It is set by the LRM.

The LRM LINK_CHANNELS_AVAILABLE register has the format defined by table 4. It is similar to the format of the IRM CHANNELS_AVAILABLE register, although it functions in a different way.

TABLE 4

| 0 | 31 |
|---|---|
| link_channels_available_hi | |
| link_channels_available_lo | |
| 32 | 32 bits | 63 |

The register's contents have the same meaning as those of the IRM's CHANNELS_AVAILABLE register.

The wireless link may allow a maximum number of channels which will be lower or higher than the boundary of 64 channels of an IEEE 1394 bus. Even if the link admits a higher number of channels compared to the IEEE 1394 channels, only the latter number will be used, since the IRM of the IEEE 1394 network will be limited to this number.

Figure 3:
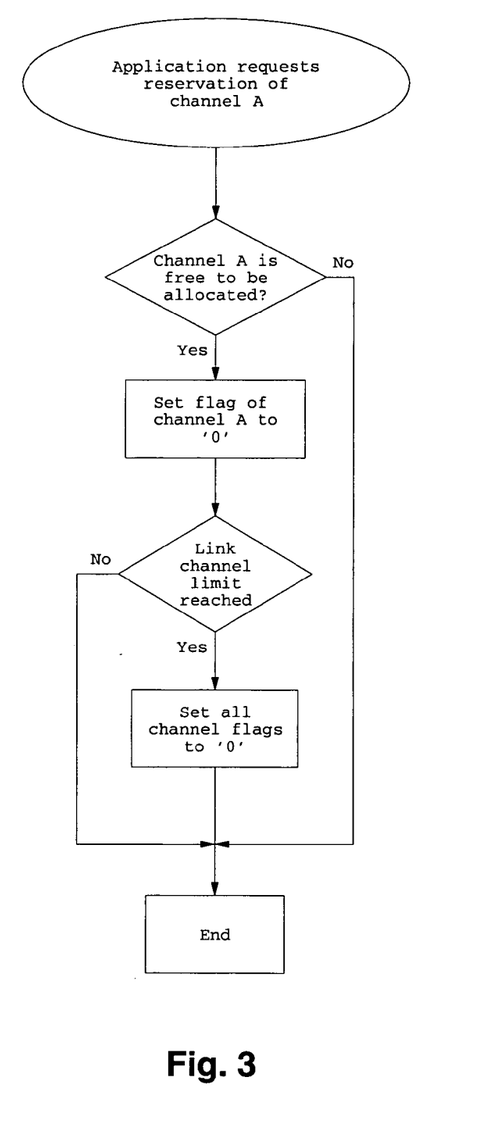
FIG. 3 is a flowchart of a method for reserving a channel using a register indicating available channels over a wireless link.

If the wireless link admits a lower number of channels, the following algorithm will be used. This algorithm is illustrated by FIG. 3 for the reservation mechanism and FIG. 4 for the release mechanism.

The link_channels_available (link_channels_available_hi and link_channels_available_lo) bits have to be set to '1' as initial values.

When an application requests a channel which is free to be allocated by the link's LRM and which is not the last possible one, the reservation of that channel is accepted and the channel's flag is set to '0'.

When an application requests a channel and this channel is the last available one for the link (although there might still be available channels at the CHANNELS_AVAILABLE register of the IRM), the reservation of the channel is accepted, and all flags of the LINK_CHANNELS_AVAILABLE register are set to '0', in order to show that there are no more channels available through this link.

The LRM keeps in memory the list of channels of the register which have indeed been reserved by an application, as compared to those channels which are simply made unavailable because of the restrictions imposed by the wireless link.

Figure 4:
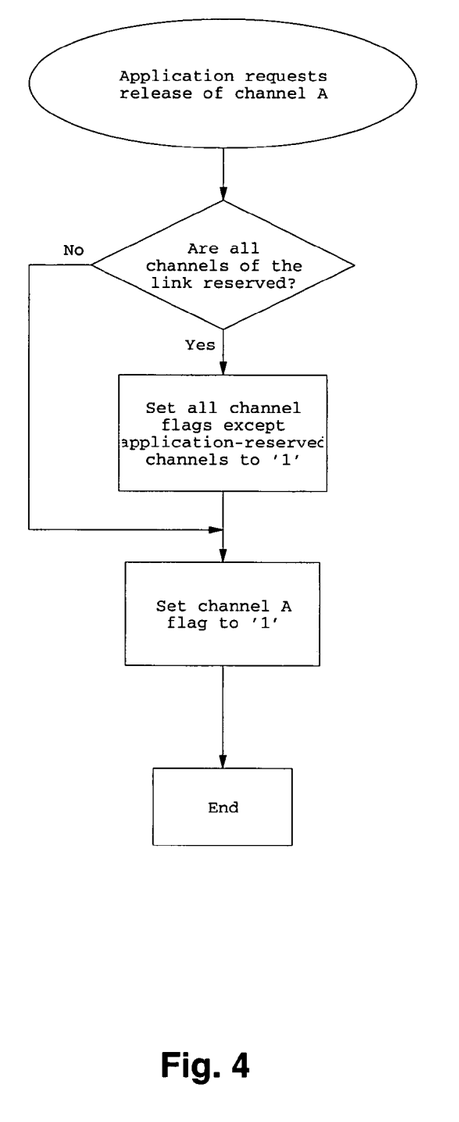
FIG. 4 is a flowchart of a method for releasing a reserved channel.

When an application releases a channel, the specified channel's flag is set to '1'. If the link was fully reserved, this channel release also triggers the setting of all non-reserved channels' flags to '1'.

The LINK_CHANNELS_AVAILABLE register is not managed the same way as the CHANNELS_AVAILABLE register of the IRM. It will accept Read requests, but not Lock requests. An application can thus check whether channels remain available over the wireless link. The actual channel reservation will be made by the LRM following an application's Lock request on the LINK_BANDWIDTH_AVAILABLE register.

3. Register Use

The LINK_BANDWIDTH_AVAILABLE register has more functions than just indicating the available bandwidth. When read using a Read request, it returns the bandwidth available on the link, but a Lock request triggers not only the reservation of bandwidth, but also the reservation of a channel. The LINK_CHANNELS_AVAILABLE register then needs only to be accessed in Read mode, not in Lock mode.

An application wishing to make a reservation first carries out reservations with the IRM, and then uses the obtained channel number and reserved bandwidth to make reservations over the wireless links between the source and sink nodes.

When performing a Lock request on the LINK_BANDWIDTH_AVAILABLE register, the caller has to provide the 'PhyID' value of the source device on the IEEE 1394 network, the PhyID of the sink device on the 1394 network, the required channel (this channel having already been allocated by the IRM), and the new bandwidth value, i.e. the value read during the Read request, decremented by the amount to be reserved.

With one message (i.e. the Lock request), all allocations are performed (bandwidth as well as channel). The source and sink PhyIDs are used by the link LRM if it has the capability to process different bandwidths between its portal devices.

The behavior of the LINK_BANDWIDTH_AVAILABLE register can be described with the help of tables 5 to 7, respectively showing the initial values, values obtained following a Read request and values obtained following a Lock request.

TABLE 5

Initial values

| zeros | zeros | 0 | zeros | 4915 or less |
|---|---|---|---|---|
| 6 bits | 6 bits | 1 | 6 bits | 13 bits |

TABLE 6

Read values

| zeros | zeros | 0 | zeros | link_bw_remaining |
|---|---|---|---|---|
| 6 bits | 6 bits | 1 | 6 bits | 13 bits |

TABLE 7

Lock effect

| ignored | ignored | i | ignored | conditionally written |
|---|---|---|---|---|
| 6 bits | 6 bits | 1 | 6 bits | 13 bits |

('i' = ignored)

When a Read request is performed, the link_bw_remaining value is returned in the Read response.

A Lock request comprises the value of the bandwidth previously read ('arg_value' field according to the IEEE 1394 1995 vocabulary), as well as the new bandwidth value ('data_value'). The LRM compares the current value of the link_bw_remaining field with the value received in the Lock request. If these values are equal, the reservation may proceed, since no other request was granted between the current Read and Lock requests. The new bandwidth value written into the link_bw_remaining field will not necessarily be the value sent in the Lock request and in the Lock response, because of the calculation rules for multi-portal links mentioned previously. In other words, the next Read request may not necessarily result in the remaining bandwidth value sent with the last Lock request.

The reasons for a possible failure of the Lock request on LINK_BANDWIDTH_AVAILABLE register are:

1. The bandwidth available on the link was changed in the interval between the current Read and Lock requests, and so the 'arg_value' of the Lock request is not valid. The LRM manages this situation in the same way as the IRM.

2. The bandwidth available between the source and the sink over the link is not sufficient. This may not have been detected when reading the register because the value given back in the link_bw_remaining field may be the available bandwidth for the best transmission over the link. A link with different bandwidth capacities depending on the portals considered may then reject the Lock giving back the real bandwidth on the path between source and sink PhyIDs, since the LRM knows the PhyIDs from the Lock request message and can then calculate the true bandwidth available for this particular connection.

3. The required channel is no more available. This is only possible when another application allocates another channel (because the requested one is already allocated at the IRM), and this other channel was the last available channel on the link, although some channels may remain free in the IRM's CHANNELS_AVAILABLE register. In this case, the connection cannot be established by the link's LRM. The LRM sets the 'f' bit to '1' in the Lock response in order to reflect this.

The behavior of the LINK_CHANNELS_AVAILABLE register can be described with the help of tables 8 and 9, respectively showing the initial values, values obtained following a Read request and values obtained following a Lock request:

TABLE 8

Initial values

| ones |
|---|
| ones |
| 32 bits |

TABLE 9

| Read values |
| --- |
| last successful lock on the LINK_BANDWIDTH_AVAILABLE register |
| last successful lock on the LINK_BANDWIDTH_AVAILABLE register |
| 32 bits |

In case an application fails to obtain the required reservations from any of the LRMs of the links between the source and sink nodes, it has to request deallocation of already reserved resources.

4. Example of Use of the LINK_BANDWIDTH_AVAILABLE Register

In what follows, an example of use of the LINK_BANDWIDTH_AVAILABLE register of the LRM is given, described with the help of tables 10 to 16. It is supposed that in the frame of this example, the link supports a maximum of two channels.

The initial value of the register is given by table 10, taking a total available bandwidth of 4915 units as an example.

TABLE 10

| zeros | zeros | 0 | zeros | 4915 |
| --- | --- | --- | --- | --- |
| 6 | 6 | 1 | 6 | 13 |

The application of node 23 of FIG. 2 wishes to allocate a channel and bandwidth across the link between the node 23 (source) and the node 25 (sink). First, it requests allocation of a channel and bandwidth at the IRM, following IEEE 1394 1995 rules. The allocated channel is for example channel number 7, and the bandwidth is 500 units. Then the application of node 23 performs a Lock request on the LINK_BANDWIDTH_AVAILABLE register of the LRM, the parameters of which are shown in table 11.

TABLE 11

|  | Source | Sink |  | Channel | Bandwidth |
| --- | --- | --- | --- | --- | --- |
| arg_value | 0 | 0 | 0 | 0 | 4915 |
| data_value | 23 | 25 | 0 | 7 | 4415 |
|  | 6 | 6 | 1 | 6 | 13 |

If the Lock is accepted (and the LINK_CHANNEL_AVAILABLE register is updated), the response is as given by the parameter of table 12.

TABLE 12

| new_value | 23 | 25 | 0 | 7 | 4415 |
| --- | --- | --- | --- | --- | --- |
|  | 6 | 6 | 1 | 6 | 13 |

Then the application of node 26 decides to allocate a channel and bandwidth across the link, between the node 26 (source) and the node 24 (sink). It is supposed that a reservation has already been made with the IRM. As an example, the channel is channel number 33, and the required bandwidth is of 1000 units. At the same time, the application of node 25 performs a Lock request at the LRM for channel 12 and 2000 bandwidth units between source node 29 and sink node 30, as indicated by table 13.

TABLE 13

| arg_value | 0 | 0 | 0 | 0 | 4415 |
| --- | --- | --- | --- | --- | --- |
| data_value | 29 | 30 | 0 | 12 | 2415 |
|  | 6 | 6 | 1 | 6 | 13 |

If the Lock is accepted (and the LINK_CHANNEL_AVAILABLE register is updated), the response is that given by table 14.

TABLE 14

| new_value | 29 | 30 | 0 | 12 | 2415 |
| --- | --- | --- | --- | --- | --- |
|  | 6 | 6 | 1 | 6 | 13 |

The Lock request of the application of node 26 will be rejected because this link can only provide two channels.

TABLE 15

| arg_value | 0 | 0 | 0 | 0 | 4415 |
| --- | --- | --- | --- | --- | --- |
| data_value | 26 | 24 | 0 | 33 | 3415 |
|  | 6 | 6 | 1 | 6 | 13 |

The Lock response is rejected and the fields of the register become:

TABLE 16

| new_value | 26 | 24 | 1 | 33 | 2415 |
| --- | --- | --- | --- | --- | --- |
|  | 6 | 6 | 1 | 6 | 13 |

The 'f' flag is set to '1', indicating that there are no more channels on this link. The link_bw_remaining field shows the last updated value, i.e. after the grant of the request of application of node 25.

The Lock responses contain the values of the Source_PhyID, Sink_PhyID and Channel fields to help the caller in retrieving what it asked for.

The following operations may be carried out when reserving or releasing resources:

"Allocate New":

This operation consists in allocating a new channel and a quantity of bandwidth. The channel is available and free, the required bandwidth is available. The operation is called an allocation because the previously read value of bandwidth transmitted with the request ('arg_value') is greater than the new value to be written into the link_bw_remaining field ('data_value'). The channel_available flag is set to '0'.

The LRM memorizes the relation between the channel and the allocated bandwidth.

According to a variant embodiment, a channel may be reserved without bandwidth. Such a possibility may be portal vendor dependent.

"Allocate More":

This operation consists in allocating additional bandwidth to a previously allocated channel, if sufficient bandwidth is available. The LRM identifies such an operation by the fact that the channel number of the Lock request corresponds to a channel which is already allocated. The requested differential of bandwidth is added to the bandwidth already reserved for this channel. The channel_available flag remains at '0'. The portal cannot prevent applications from reserving bandwidth on already allocated channels to send another stream which would cause collision on the bus (as in 1394-1995).

"Release Full":

This operation consists in releasing a channel as well as the bandwidth allocated for this channel. The LRM identifies the operation as a release because the 'arg_value' field of the Lock request (containing the result of the Read request) is lower than its 'data_value' (containing the new value to be written into the link_bandwidth_available field). The fact that the release of resources is a full release is shown by the fact that the difference between the two previous fields is equal (or greater) to the bandwidth allocated for this channel. The channel's flag in the LINK_CHANNELS_AVAILABLE register is set to free ('1'). In case the Lock request indicates a release of more than the allocated bandwidth, only the allocated bandwidth is released.

"Release Some":

This operation consists in releasing only part of the bandwidth for a given channel. The LRM identifies the requested operation as a release through the fact that the 'arg_value' of the bw_remaining field of the Lock request is lower than its 'data_value', and that it is partial because the difference is lower than the bandwidth allocated for this channel. The channel remains reserved (the corresponding flag keeps the value '0') in the LINK_CHANNELS_AVAILABLE register. The released bandwidth is subtracted for the channel and the LRM keeps track of it.

In case all channels available over a link are reserved, all flags of the LINK_CHANNELS_AVAILABLE register are set to '0'. The LRM nevertheless keeps a list of the channels which have truly been reserved as compared to those which are just marked as such in the register. When a Lock request for an 'Allocate More' operation is received by the LRM, the latter will allocated additional bandwidth only if the request corresponds to a truly reserved channel.

5. Example of Use of the LINK_CHANNELS_AVAILABLE Register

An example illustrating the use of the LINK_CHANNEL_AVAILABLE register will now be given, described with the help of tables 17 to 21, which show the contents of the register at different times. According to this example, the wireless link has a capacity of three channels.

Initially, no channel over the wireless link is used. The state of the LINK_CHANNELS_AVAILABLE register is given by table 17:

TABLE 17

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

A first application reserves for example channel 7. The state of the register after the allocation is given by table 18.

TABLE 18

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

A second application then reserves channel 33. The register's state becomes:

TABLE 19

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

There is only one available channel left on this link. When a third application allocates channel 2, the register's state becomes:

TABLE 20

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

As the link cannot provide more channels, all channel flags are set to '0'. If a fourth application reads the register of this link, it will deduce that no further channel can be reserved.

Now if the second application releases the channel 33, the register's state becomes:

TABLE 21

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 1 | 1 | 0 | 1 | 1 | 1 | 1 | 0 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |

One channel is now available on the wireless link: flags of all unused channels are set to '1'.

Advantageously, the fact that a channel needs to be reserved with the global IRM first guarantees that there will be no conflict regarding the identification of a channel to be reserved over a plurality of wireless links. It is not possible to reserve a channel with an LRM if it has not been allocated first by the IRM.

The applications of the network may or may not be aware of the wireless links. In case a non-link aware application builds a connection including one or more wireless links, the LRMs of these links may make the reservations of the required resources by themselves, or according to a variant, gives priority to connections made by link-aware applications.

6. Methods for Connection Establishment

Here is a short presentation of several connection methods that a link aware application uses according to the present embodiment. The methods concern the opening of a connection, the destruction of a connection, the re-establishment of a connection after a bus reset, and the overlaying of a connection over an existing connection.

At several instances in the methods below, an application needs to obtain the topology of the network, in order to determine whether one or several links on which resources are to be reserved are on the path between the talker node and the listener node.

A topology map may be obtained by an application from the IEEE 1394 physical layer, which establishes such a map after a bus reset. The map indicates how the different nodes are connected.

According to the present embodiment, each portal comprises in its memory an identifier which designates it as a portal. Once an application has obtained the topology map—this is required only once after a reset—it accesses the memories of all nodes on the network in order to determine whether these nodes are portals or not. A link is identified when two portals are detected in series in the topology map.

6.1 Opening a Connection

To open a connection, an application has to:

1. Determine the topology map of the network, and check if one or several links are on the path between the source node and the sink node.

2. Perform a Read request on the output Plug Control Register ('oPCR', as defined in IEC 61883, describing isochronous stream transmission over a IEEE 1394 bus) of the source node to obtain the required bandwidth, if this information was not given by the caller client (i.e. the application).

3. Perform Read requests on:
the IRM BANDWIDTH_AVAILABLE register (to obtain the quantity of available bandwidth on the IEEE 1394 network)
the IRM CHANNELS_AVAILABLE register (to obtain the list of available channels on the IEEE 1394 network)
the LRM LINK_BANDWIDTH_AVAILABLE register for each link crossed by the connection (to obtain the quantity of available bandwidth over each link)
the LRM LINK_CHANNELS_AVAILABLE register for each link crossed by the connection (to check channel availability)
the input Plug Control Register ('iPCR' as defined in IEC 61883) of the sink node to verify that it is free and can receive a stream 4. Perform Lock requests on:
the IRM BANDWIDTH_AVAILABLE register (to reserve bandwidth on the IEEE 1394 network)
the IRM CHANNELS_AVAILABLE register (to reserve a channel on the IEEE 1394 network)

5. If the requests were successful, perform Lock requests on:
the LRM LINK_BANDWIDTH_AVAILABLE register for each link crossed by the connection with the source PhyID, the sink PhyID and the channel number already allocated at the IRM (in order to reserve bandwidth on each link)
the oPCR of the source (in order to modify this register so that it shows the existence of the connection)
the iPCR of the sink (in order to modify this register so that it shows the existence of the connection)

6.2 Closing a Connection

To close a connection, an application has to:

1. Perform Read requests on:
the oPCR of the source to verify that it is not overlaid (i.e. there is only one listener node part of the connection)
the IRM BANDWIDTH_AVAILABLE register
the LRM LINK_BANDWIDTH_AVAILABLE register for each link crossed by the connection 2. Perform Lock requests on
the IRM BANDWIDTH_AVAILABLE register
the IRM CHANNELS_AVAILABLE register
the LRM LINK_BANDWIDTH_AVAILABLE register for each link crossed by the connection
the oPCR of the source node
the iPCR of the sink node 6.2 Reestablishing Connections After a Network Reset The bus reset is propagated by the links. An application which built a connection is aware that a bus reset occurred, wherever it originated. The re-establishment basically follows the same rules as the creation of a connection. The LRM registers are reset the same way as the IRM registers.

6.3 Overlaying a Connection

To overlay a connection, an application has to:

1. Obtain the topology map, and check if one or several links are on the path between the source node and the sink node, and deduce which ones are already reserved for the connection.

2. Perform a Read request on the oPCR of the source to know the required bandwidth (if it was not given by the caller client).

3. Perform Read requests on:
the LRM LINK_BANDWIDTH_AVAILABLE register for each link crossed by the connection and not already reserved, (to obtain the quantity of available bandwidth over each link)
the LRM LINK_CHANNELS_AVAILABLE register for each link crossed by the connection and not already reserved, (to check channel availability)
the iPCR of the sink node to verify that it is free 4. Perform Lock requests on:
the LRM LINK_BANDWIDTH_AVAILABLE register for each link crossed by the connection and not already reserved, with the source PhyID, the sink PhyID and the channel number already allocated at the IRM.
the oPCR of the source node
the iPCR of the sink node Using the above, an application may detect whether a connection may be established or not, and what link failed to provide the sufficient resources. According to methods that are not the purpose of the present description, the application may suggest modifications of the topology of the network in order to avoid failed connections.

Figure 8:
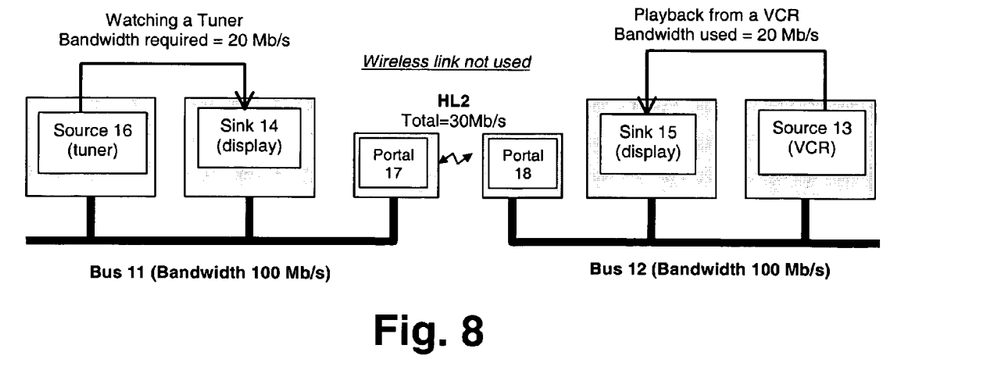
FIG. 8 is a diagram of the network of FIG. 1, where the connection of nodes to the busses have been modified in order to reduce use of the wireless link.

FIG. 8 represents the network of FIG. 1, in which sources 13 and 16 have been connected to busses 12 and 11 respectively, in response to an application's indication to a user.

7. Improvement of the Bandwidth Use

If a first application reserves a bandwidth of 20 Mb/s over a HiperLAN 2 link offering 30 Mb/s, but uses only 10 Mb/s, 10 Mb/s of bandwidth are wasted. A second application requiring 15 Mb/s cannot make a reservation.

According to a variant of the embodiment, a link's LRM verifies the real use of bandwidth by an application compared to the reserved bandwidth and makes the difference available for allocation to another application.

Figure 5:
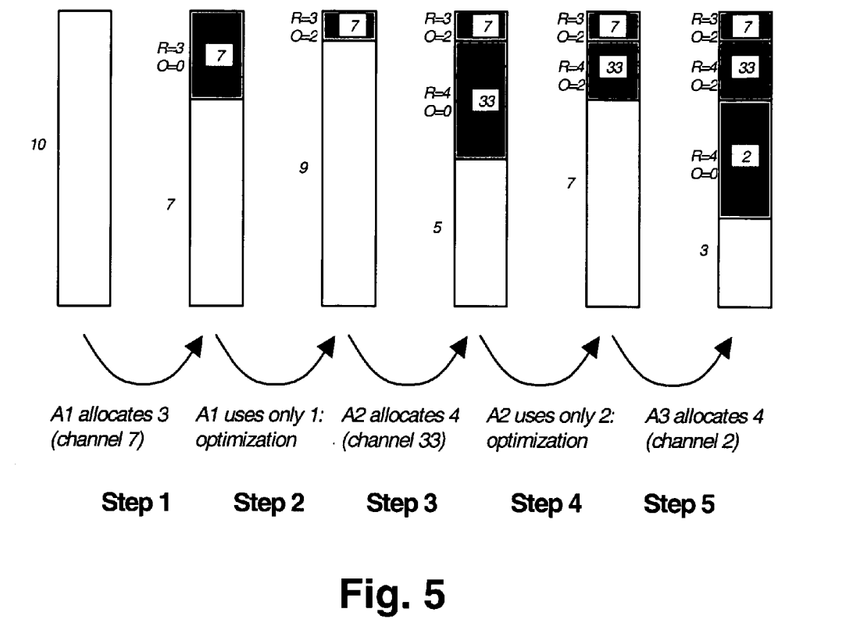
FIG. 5 is a diagram illustrating the reservation and use of bandwidth over a link according to a variant embodiment of the invention.

FIG. 5 shows a vertical bar representing the bandwidth available over a link. For the purpose of this example, the total available bandwidth is of ten units. For each channel reserved by an application, the LRM maintains two parameters. The first parameter (labeled 'R' in what follows) represents the reserved bandwidth. The second parameter (labeled 'O') represents the difference between the reserved bandwidth and the bandwidth really used by the application on the channel. O represents the optimized bandwidth for this channel.

According to the example of FIG. 5, three applications (A1, A2, A3) reserve bandwidth sequentially. The values near the letters R and O respectively represent the bandwidth values for each application.

The first application A1 reserves three units on channel 7 (step 1), but the LRM determines that it uses only one. It sets the parameter O for A1 to the value two (step 2). Application A2 then reserves four units on channel 33 (step 3), but uses only two: the parameter O for this application also takes on the value two (step 4). Lastly, application A3 reserves four units on channel two and uses them entirely (step 5). Thus three units may be allocated to further applications, and the LRM sets a new link_bw_available value appropriately.

Figure 6:
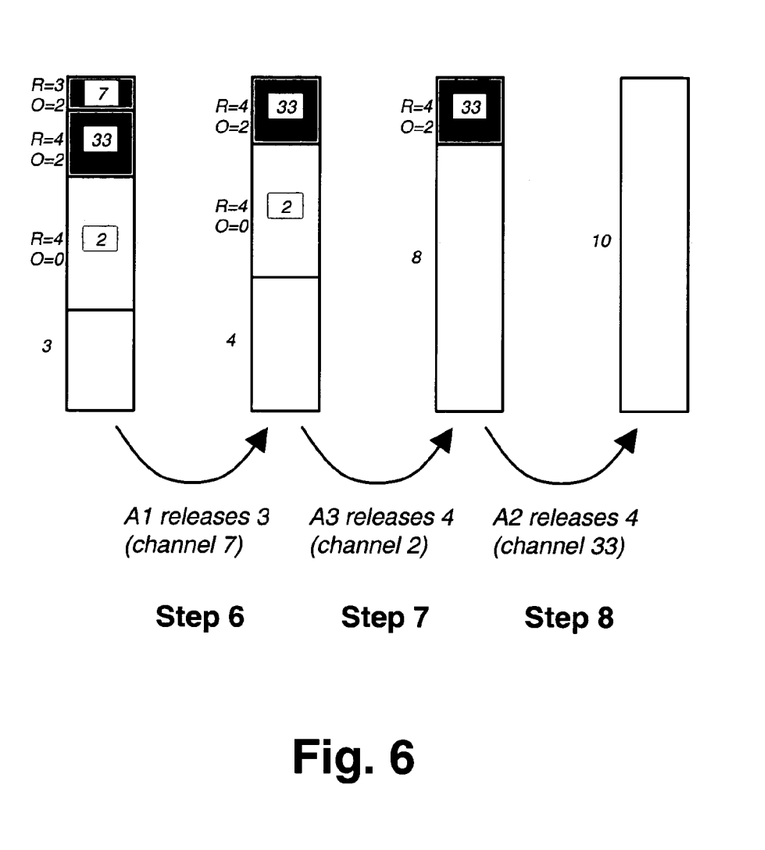
FIG. 6 is a diagram illustrating the release of bandwidth of FIG. 5.
Figure 7:
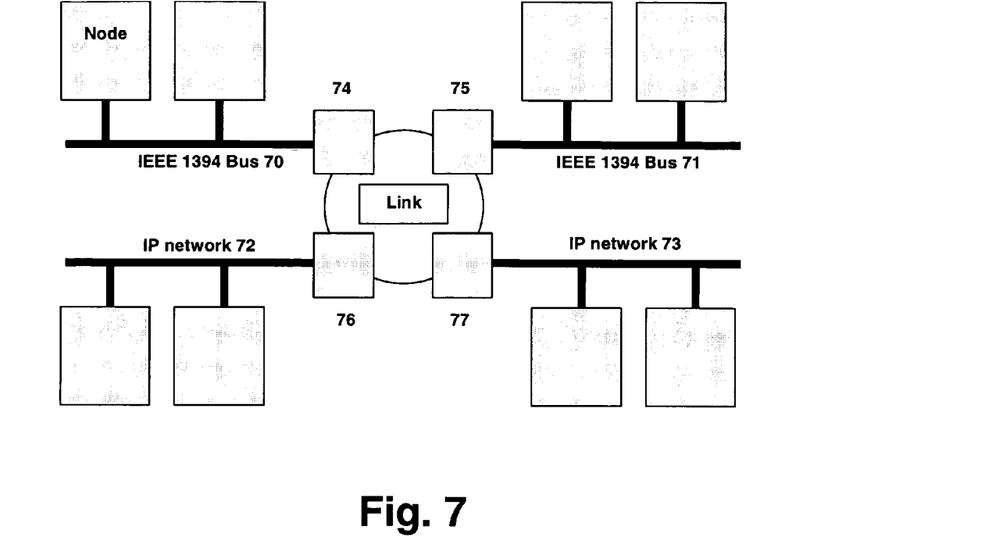
FIG. 7 is a diagram of a multi-portal link shared between networks of different type according to a variant embodiment of the invention.

FIG. 6 represents the bandwidth of FIG. 5 when applications start releasing bandwidth. Since applications are not aware of the fact that the bandwidth they reserved has not been totally set apart for their use, they will release the reserved amount using appropriate Lock requests.

Suppose the application A1 wishes to release its channel and bandwidth (step 6). It will send a Lock request trying to increase the link_bw_available value, equal to three, by three units. The LRM will simulate to the application A1 the release of three units, using a positive Lock response comprising the link_bw_available value increased by three units, but will effectively increase this value only by the actually used amount of units, i.e. one. A similar concept applies for the release of resources for A3 and A2.

According to this procedure, an application may have to use in its Lock request bandwidth values which are greater than the maximum bandwidth given in the LINK_BAND-WIDTH_AVAILABLE register. For example, during step 8, in order to release four units of bandwidth, application A2 will use the desired value ('data_value') of twelve in its Lock request, since the current value of the register is of eight.

A release of bandwidth by an application must nevertheless not result in the use of a bandwidth value exceeding 0x1FFF, since this represents the greatest value which may be coded on the 13 bits reserved for this purpose. Consequently, an LRM should not provide an improvement of bandwidth on one channel of more than 0x1FFF minus the maximum bandwidth available over the link.

For example, with a link bandwidth of 0x1333, the maximum improvement for any one channel should not exceed 0xCCC.

8. Interconnection of a Plurality of Networks Using a Single Link

According to a variant embodiment, a link is used simultaneously by several types of networks. FIG. 8 is a diagram of a link comprising four portals 74 to 77. Portals 74 and 75 are connected respectively to two IEEE 1394 busses 70 and 71. Portals 76 and 77 are connected respectively to two IP networks 72 and 73. The two busses 70 and 71 are connected in a transparent manner by the link, i.e. at lower layers all bus devices are considered to be on a single bus. The same is true for the two IP networks: all IP devices are considered to be on a single IP network. The resulting networks of busses 70/71 and of IP networks 72/73 ignore each other's existence. They nevertheless share the use of the resources of the link formed by portals 74 to 77. Portals may all be included in a single device, or may be formed by separate devices (in the case of a wireless link for example).

The portals have to allocate bandwidth resources to both network types. According to the present embodiment, separate LRMs are provided for each type of network. In the case of the present example, one LRM is provided for the network of IEEE 1394 busses, and one LRM is provided for the IP networks. The two LRMs are called LRM-1394 and LRM-IP in what follows. The interface provided by the LRM-IP to IP devices need not be the same as that provided by the LRM-1394 to IEEE 1394 nodes.

Since both LRMs allocate the same resources, they exchange information regarding allocation of resources, depending on the actual implementation of the link.

It has been previously mentioned that the bandwidth used over the link between two busses for example generally cannot exceed the bandwidth available on the busses, even if the link's capacity is greater. In the present case, the fact that several networks compete for the same resources will have a limiting effect for a given network only under certain circumstances.

The following cases are taken into account:

The link bandwidth is higher than the IEEE 1394 bandwidth.

In this case, reserving bandwidth on the IP networks will not decrease the bw_remaining value of the LINK_BAND-WIDTH_AVAILABLE register of the LRM-1394, until the bandwidth reserved by the IP networks will let the total link bandwidth drop lower than 0x1333 bandwidth units (IEEE 1394 units).

The same behavior applies for the channels.

The reverse is true (i.e. bandwidth and channel reservation by the IEEE 1394 network).

9. LRM Election

The invention works with point-to-point links (comprising only a pair of portals per network) but also with multi-point links (comprising more than two portals per network). In both cases, two possibilities exist for the choice of the LRM device in a given network: one portal (for each of the networks) takes the role of the LRM, and every application is sending messages to this device; or each application sends messages to the portals it is connected to, and a private protocol inside the link synchronizes the portals.

In other words, in the first cases, the LRM is managed by a single portal elected among all candidate portals, the elected portal being known to the applications, while in the second case, no election takes place and the applications do not know where the LRM is located and simply send requests to their nearest portal.

These two possibilities will now be described in case the network comprising the link is a network of IEEE 1394 busses.

(a) Single LRM Portal Election

One portal takes the role of LRM. The election is carried out during a network or bus reset. Two alternative methods for electing the LRM portal will now be described. The first method is based on an analysis of the network topology. The second method is based on a decision made by the portals, followed by an announcement or exposure of the physical identifier of the elected LRM to applications.

Topology Algorithm:

According to this method, the portal having the greatest PhyID value among the candidate portals is elected LRM. This algorithm has the advantage of being very simple, since the topology is readily available from the IEEE 1394 layers. After each bus reset, applications have to check the topology to determine the new LRM for each link.

Private Link Choice:

This method implements a dynamic protocol "inside" the link (i.e. between the portals, according to a protocol which may be specific to the link), which means that the LRM can change after a bus reset (for example if the portal which was LRM is removed).

Furthermore, in order to let the IEEE 1394 applications know which node represents the LRM, a specific entry has to be defined in the configuration memory ('config rom') of the portals. This new entry will exist in the config rom of all the portal devices.

The format of the memory entry according to the present example is given by table 22. Other formats are possible.

TABLE 22

| 8 bits | 1 bit | | 6 bits |
|---|---|---|---|
| Key_ID = $30_{16}$ | s | reserved | Phy ID |

's' is the synchronization bit. When it is set to '1', the Phy ID value is considered not up-to-date, and is currently changing. This may happen for example after a bus reset. When it is equal to '0', the Phy ID value represents the Phy ID of the LRM for this link. The method of updating the Phy ID value is private to the link.

(b) No LRM Portal Election

According to this second method, each application sends messages (i.e. Read and Lock requests) to the portal it is connected to. Each portal implements the LRM registers. A private protocol inside the link has to carry out the synchronization between the portals to avoid the conflicts of simultaneous multiple Lock requests.

What is claimed is:

1. Method for managing resources of a link in communication network comprising at least two busses coupled to the link to form a network having a plurality of nodes, wherein the network forms a single virtual bus regarding the protocol used by a bus, all nodes being considered to be on said single bus, and the link being transparent to the bus protocol, said method comprising the steps of:

providing a link-aware application in a node of the network for obtaining link resource reservation information, for establishment of a connection between devices over the link, accessing said information, and determining whether the connection can be established as a function of this information, wherein the link-aware application gets said information from one of the portals connecting busses to the link, wherein said information comprises resources available over the link, and wherein an application establishes a connection between two nodes of the network through the steps of:

(a) reserving a resources and bandwidth for the connection on the busses;

(b) identifying links on the path between the nodes to be connected;

(c) reserving resources for each link on said path if step (a) has been successful.

2. Method according to claim 1, wherein said information comprises bandwidth available over the link.

3. Method according to claim 1, wherein the step of reserving resources for each link comprises the step of:

having the application request the reservation of the same bandwidth and the same channel as reserved in step (a) from each link.

4. Method according to claim 1 wherein the step of reserving resources for each link further comprises the steps of:

by the application, sending identifiers of the nodes to be connected to a portal of a link whose resources are to be reserved;

having the application request the reservation of bandwidth;

having the link determine whether the requested bandwidth is available, as a function of the nodes to be connected;

accepting or rejecting the bandwidth reservation request as a function of this determination.

5. Method according to claim 4 comprising the step of providing a register showing channel availability for the network and a register being provided showing channel availability for each link, these two registers having the same number of channels, each link having a maximum number of channels which can be reserved in parallel, said maximum number being lower or equal to the number of channels in the registers, further comprising the step of, after a channel reservation has been accepted, to check whether the maximum number of channels which can be reserved in parallel has been reached for each link, and in the affirmative, modifying the register of the said link in order to show no available channels for that link.

6. Method according to claim 1 wherein the step of reserving resources for each link further comprises the steps of:

having the application request the reservation of a channel;

having the link check the availability of the requested channel, and if a channel over the link is available, accept the channel reservation;

checking whether a maximum number of reserved channels on the link has been reached and in the affirmative, rejecting any further reservation.

7. Method according to claim 1, wherein a resource manager, which is located in only one portal provides said information to the link-aware application.

8. Method according to claim 1, wherein the at least two busses are connected through a wireless link.

9. Method according to claim 1, wherein the single virtual bus is an IEEE 1394 bus.

10. Method for managing resources of a link in a communication network comprising at least two busses con nected to the link to form a network, wherein the network forms a single virtual bus regarding the protocol used by a bus, all nodes being considered to be on said single bus, said method comprising the steps of:
provide a link-aware application in a node of the network for obtaining link resource reservation information, for establishment of a connection between devices over the link, accessing said information, and determining whether the connection can be established as a function of this information;
wherein the link-aware application gets said information from one of the portals connecting busses to the link;
wherein an application establishes a connection between two nodes of the network through the steps of:
(a) reserving a channel and bandwidth for the connection on the busses;
(b) identifying links on the path between the nodes to be connected;
(c) reserving resources for each link on said path if step (a) has been successful,
and wherein the step of reserving resources for each link further comprises the steps of:
by the application, sending identifiers of the nodes to be connected to a portal of a link whose resources are to be reserved;
having the application request the reservation of bandwidth;
having the link determine whether the requested bandwidth is available, as a function of the nodes to be connected;
accepting or rejecting the bandwidth reservation request as a function of this determination.

11. Method for managing resources of a link in a communication network comprising at least two busses connected to the link to form a network having a plurality of nodes, wherein the network forms a single virtual bus regarding the protocol used by a bus, all nodes being considered to be on said single bus, said method comprising the steps of:
providing a link-aware application in a node of the network for obtaining link resource reservation information, for establishment of a connection between devices over the link,
accessing said information, and
determining whether the connection can be established as a function of this information;
wherein the link-aware application gets said information from one of the portals connecting busses to the link;
wherein an application establishes a connection between two nodes of the network through the steps of:
(a) reserving a channel and bandwidth for the connection on the busses;
(b) identifying links on the path between the nodes to be connected;
(c) reserving resources for each link on said path if step (a) has been successful,
and wherein the step of reserving resources for each link further comprises the steps of:
having the application request the reservation of a channel;
having the link check the availability of the requested channel, and if a channel over the link is available, accept the channel reservation;
checking whether a maximum number of reserved channels on the link has been reached and in the affirmative, rejecting any further reservation.

12. Method for managing resources of a wireless link in a communication network comprising at least two busses connected to the wireless link by portals to form a network, wherein the network forms a single virtual bus regarding the protocol used by a bus, and the link being transparent to the bus protocol, said method comprising the steps of: providing a link-aware application in a node of the network for obtaining wireless link resource reservation information,
accessing said link resource reservation information for establishing a connection between devices over the wireless link, and
determining whether the connection can be established as a function of the link resource reservation information,
for establishment of a connection between devices over the link, accessing said information, and
determining whether the connection can be established as a function of this information,
wherein the link-aware application gets said information from one of the portals connecting busses to the link,
wherein said information comprises resources available over the link, and
wherein an application establishes a connection between two nodes of the network through the steps of:
(a) reserving a resources and bandwidth for the connection on the busses;
(b) identifying links on the path between the nodes to be connected;
(c) reserving resources for each link on said path if step (a) has been successful.

* * * * *